United States Patent
de Sousa

(10) Patent No.: US 9,659,067 B2
(45) Date of Patent: May 23, 2017

(54) PROVIDING A SEARCH RESULTS DOCUMENT THAT INCLUDES A USER INTERFACE FOR PERFORMING AN ACTION IN CONNECTION WITH A WEB PAGE IDENTIFIED IN THE SEARCH RESULTS DOCUMENT

(71) Applicant: Google Inc., Mountain View, CA (US)

(72) Inventor: David Reis de Sousa, Belo Horizonte (BR)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/981,188

(22) Filed: Dec. 28, 2015

(65) Prior Publication Data

US 2016/0117331 A1   Apr. 28, 2016

Related U.S. Application Data

(63) Continuation of application No. 13/536,501, filed on Jun. 28, 2012, now abandoned.

(51) Int. Cl.
*G06F 17/30* (2006.01)
*G06F 17/22* (2006.01)

(52) U.S. Cl.
CPC ...... *G06F 17/3053* (2013.01); *G06F 17/2235* (2013.01); *G06F 17/30554* (2013.01); *G06F 17/30864* (2013.01); *G06F 17/30867* (2013.01)

(58) Field of Classification Search
CPC ......... G06F 17/30525; G06F 17/30882; G06F 17/30312; G06F 17/3089; G06F 17/2235; G06F 17/30864; G06F 17/30867; G06F 17/30554
See application file for complete search history.

(56) References Cited

U.S. PATENT DOCUMENTS

| | | | |
|---|---|---|---|
| 5,155,803 A * | 10/1992 | Barabash | G06N 5/047 706/10 |
| 7,627,582 B1 | 12/2009 | Ershov | |
| 7,747,959 B2 | 6/2010 | Keller et al. | |
| 8,683,379 B2 | 3/2014 | LuVogt et al. | |
| 2002/0129106 A1* | 9/2002 | Gutfreund | G06Q 10/10 709/205 |
| 2003/0195834 A1 | 10/2003 | Hillis et al. | |
| 2005/0131866 A1* | 6/2005 | Badros | G06F 17/30867 |
| 2005/0198299 A1* | 9/2005 | Beck | G06Q 10/107 709/226 |
| 2006/0085280 A1 | 4/2006 | Murnan et al. | |

(Continued)

*Primary Examiner* — Shiow-Jy Fan
(74) *Attorney, Agent, or Firm* — Fish & Richardson P.C.

(57) ABSTRACT

A computer device is configured to identify a document; determine that the document includes an annotation, the annotation describing a user interface that is to be visually displayed in connection with information identifying the document when the information identifying the document is included in a search results document, the user interface including a user interface element that, when selected, causes an action to be performed in connection with the document, and the action being performed without obtaining the document after the user interface element is selected; determine information relating to the user interface based on the annotation; and store, in a search index, the information relating to the user interface in association with the information identifying the document.

17 Claims, 15 Drawing Sheets

(56) References Cited

U.S. PATENT DOCUMENTS

| | | | |
|---|---|---|---|
| 2006/0212509 A1* | 9/2006 | Feigenbaum | G06F 17/30873 709/201 |
| 2006/0230021 A1 | 10/2006 | Diab et al. | |
| 2006/0235885 A1 | 10/2006 | Steele et al. | |
| 2006/0265640 A1 | 11/2006 | Albornoz et al. | |
| 2007/0055745 A1* | 3/2007 | Moricz | G06F 17/30864 709/217 |
| 2007/0073756 A1* | 3/2007 | Manhas | G06F 17/30663 |
| 2007/0162428 A1* | 7/2007 | Williams | G06F 17/30056 |
| 2007/0294240 A1 | 12/2007 | Steele et al. | |
| 2008/0155386 A1* | 6/2008 | Jensen | G06F 9/5083 715/201 |
| 2008/0307454 A1* | 12/2008 | Ahanger | G06Q 30/02 725/36 |
| 2010/0293190 A1* | 11/2010 | Kaiser | G06F 3/048 707/769 |
| 2011/0047145 A1 | 2/2011 | Ershov | |
| 2011/0289079 A1 | 11/2011 | LuVogt et al. | |
| 2011/0289105 A1* | 11/2011 | Hershowitz | G06F 17/241 707/769 |
| 2011/0295851 A1* | 12/2011 | El-Saban | G06F 17/3082 707/728 |
| 2012/0084644 A1 | 4/2012 | Robert et al. | |
| 2012/0117058 A1 | 5/2012 | Rubinstein et al. | |
| 2012/0174002 A1* | 7/2012 | Martin | G06F 8/38 715/763 |

\* cited by examiner

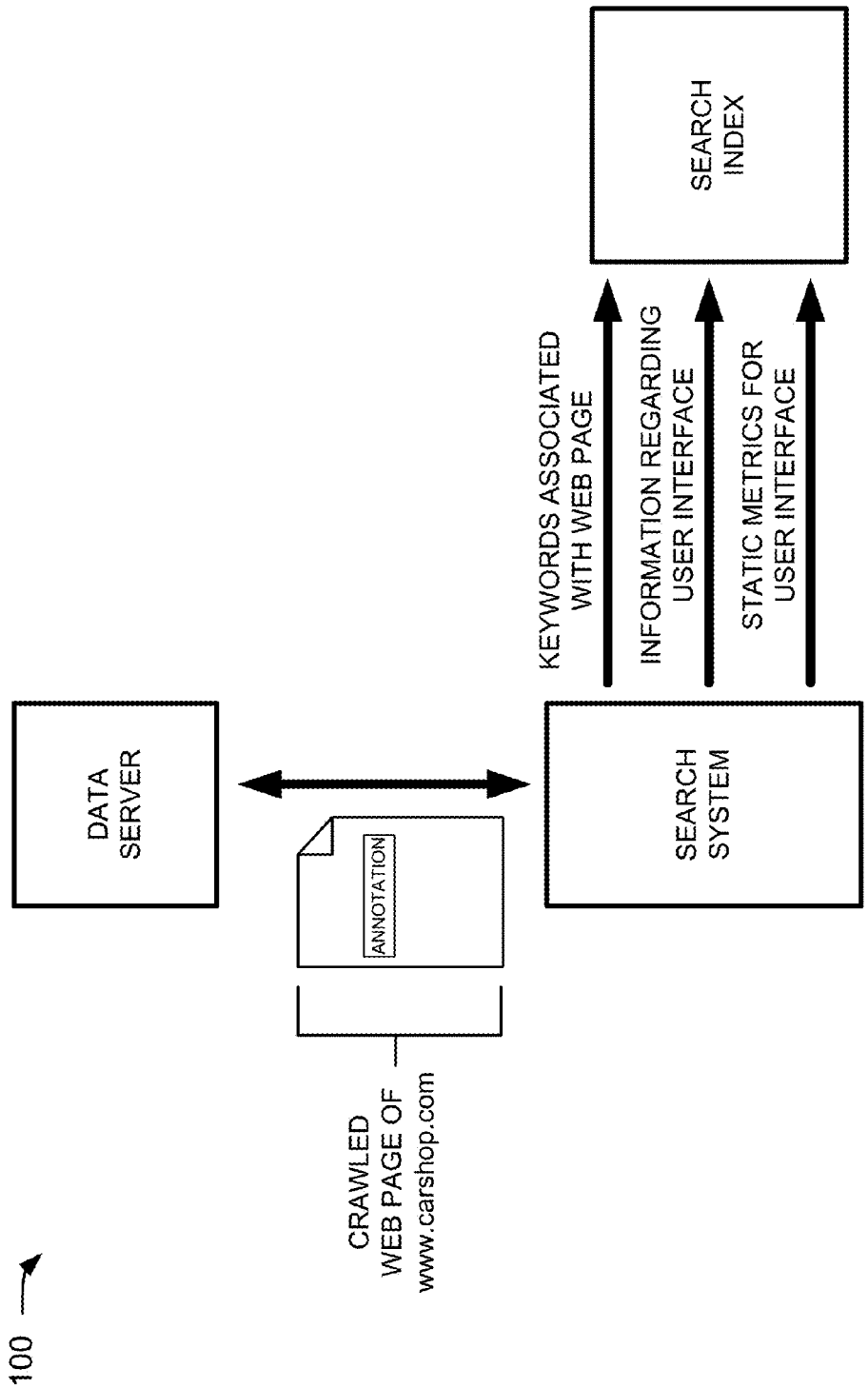

PROVIDING A SEARCH RESULTS DOCUMENT THAT INCLUDES A USER INTERFACE FOR PERFORMING AN ACTION IN CONNECTION WITH A WEB PAGE IDENTIFIED IN THE SEARCH RESULTS DOCUMENT

CROSS-REFERENCE TO RELATED APPLICATIONS

This application is a continuation application of and claims priority to U.S. application Ser. No. 13/536,501, filed on Jun. 28, 2012.

BACKGROUND

Many techniques are available to users today to find information on the World Wide Web ("web"). For example, users often use web browsers and/or search engines to find information of interest.

SUMMARY

According to some possible implementations, a method may include: identifying, by at least one of one or more computing devices, a document; determining, by at least one of the one or more computing devices, that the document includes an annotation, the annotation describing a user interface that is to be visually displayed in connection with information identifying the document when the information identifying the document is included in a search results document, the user interface including a user interface element that, when selected, causes an action to be performed in connection with the document, and the action being performed without obtaining the document after the user interface element is selected; obtaining, by at least one of the one or more computing devices and based on the annotation, information relating to the user interface; and storing, by at least one of the one or more computing devices and in a search index, the information relating to the user interface in association with the information identifying the document.

According to some possible implementations, the user interface element may correspond to a second user interface element that is included the document, and the second user interface element may cause the action to be performed when the second user interface element is selected while the document is displayed at a user device.

According to some possible implementations, obtaining the information relating to the user interface may include: determining that the annotation includes a reference pointing to a second document; obtaining, based on the reference, the second document from a server; and extracting the information, relating to the user interface, from the second document.

According to some possible implementations, obtaining the information relating to the user interface may include: determining, based on the annotation, that the document includes a particular type of annotation; extracting the annotation and one or more other annotations, of the particular type, from the document; and determining the information relating to the user interface based on the annotation and the one or more other annotations.

According to some possible implementations, the method may further include: determining a metric based on at least one of a source of the document or a type of the user interface element; storing, in the search index, the metric in association with the information identifying the document; and using the metric to determine whether the user interface is to be visually displayed when the information identifying the document is included in the search results document.

According to some possible implementations, the method may further include: receiving a query from a user device; identifying a list of documents based on the query, the list of documents including the document; obtaining, from the search index, the information relating to the user interface; including, in the search results document, information for causing the user interface to be displayed in connection with the information identifying the document; and providing the search results document to the user device.

According to some possible implementations, including the information for causing the user interface to be displayed in connection with the information identifying the document includes: obtaining, from the search index, a metric that is stored in association with the information identifying the document, determining whether the metric satisfies a threshold, and including, in the search results document, the information for causing the user interface to be displayed in connection with the information identifying the document based on the metric satisfying the threshold.

According to some possible implementations, the method may further include: receiving a query from a user device; obtaining a ranked list of documents results based on the query, the ranked list of documents including the document; determining whether a ranking of the document, in the ranked list of documents, satisfies a threshold; and including, in the search results document, information for causing the user interface to be displayed in connection with the information identifying the document based on the ranking satisfying the threshold.

According to some possible implementations, a computer-readable medium may include a plurality of instructions, which when executed by at least one processor, may cause the at least one processor to: identify a document; determine that the document includes an annotation, the annotation describing a user interface that is to be visually displayed in connection with information identifying the document when the information identifying the document is included in a search results document, the user interface including a user interface element that, when selected, causes an action to be performed in connection with the document, and the action being performed without obtaining the document after the user interface element is selected; determine information relating to the user interface based on the annotation; and store, in a search index, the information relating to the user interface in association with the information identifying the document.

According to some possible implementations, the plurality of instructions may further cause the at least one processor to: determine a metric, for the user interface, based on a measure of quality of the document; and store, in the search index, the metric in association with the information identifying the document.

According to some possible implementations, the plurality of instructions may further cause the at least one processor to: receive a query; identify a list of documents based on the query, the list of documents including the document; obtain the metric based on the information relating to the document; determine whether the metric satisfies a threshold; include, in the search results document, information for causing the user interface to be displayed in connection with the information identifying the document based on the metric satisfying the threshold; and provide the search results document to a user device.

According to some possible implementations, the plurality of instructions may further cause the at least one processor to: determine a second metric based on second information relating to a second document in the list of documents; determine whether the second metric satisfies the threshold; and include, in the search results document and based on the second information relating to the second document, information for causing a second user interface to be displayed in connection with the second information identifying the second document based on the second metric satisfying the threshold.

According to some possible implementations, the document may be a web page, and the user interface element may be at least one of a button or a text entry field.

According to some possible implementations, the document may include a second user interface element that corresponds to the user interface element, and the action may be performed when a second user interface element is selected while the document is displayed by a user device.

According to some possible implementations, a system may include a processor to: identify a document provided by a server; determine that the document includes an annotation, the annotation identifying a user interface that is to be displayed in connection with information identifying the document when the information identifying the document is included in a search results document, the user interface comprising a user interface element that, when selected, causes an action to be performed by the server, and the action being performed without obtaining the document after the user interface element is selected; determine information relating to the user interface based on the annotation; and store, in a search index, the information relating to the user in association with the information identifying the document.

According to some possible implementations, the information may relate to the user interface specifies properties of the user interface element and one or more other possible user interface elements of the user interface.

According to some possible implementations, when storing the information relating to the user interface, the processor may: determine a metric for the user interface, the metric relating to a source of the document or a type of the user interface element; determine whether the metric satisfies a threshold; and store the information relating to the user interface and the metric in the search index when the metric satisfies the threshold.

According to some possible implementations, a method may include: receiving, by at least one of one or more computing devices, a query from a user device; identifying, by at least one of the one or more computing devices, a document based on the query; obtaining, by at least one of the one or more computing devices, user interface information and a metric associated with the document, the user interface information identifying a user interface that is to be visually displayed in connection with the information identifying the document when the information identifying the document is included in a search results document, the user interface including a user interface element that, when selected, causes an action to be performed in connection with the document, the action being performed without obtaining the document after the user interface element is selected, and the metric reflecting a measure of quality of the document; determining, by at least one of the one or more computing devices, that the metric satisfies a threshold; including, by at least one of the one or more computing devices and based on the metric satisfying the threshold, particular information, in the search results document, for causing the user interface to be displayed in connection with the information identifying the document; and providing, by at least one of the one or more computing devices, the search results document to the user device.

According to some possible implementations, including the particular information in the search results document may include: determining a ranking of the document in a ranked list of document associated with the query; determining whether the ranking satisfies a different threshold; and including the particular information in the search results document when the metric satisfies the threshold and the ranking satisfies the different threshold.

According to some possible implementations, including the particular information in the search results document may include: determining, when the metric satisfies the threshold and based on the metric, a maximum amount of space available for the user interface; determining, based on the user interface information, a minimum amount of space requested for the user interface; and including the particular information in the search results document when the minimum amount of space requested for the user interface is less than the maximum amount of space available for the user interface.

According to some possible implementations, a system may include one or more processors to: receive a query from a user device; determine a list of documents based on the query, the list of documents including first information that identifies a particular document; obtain, based on the first information, second information and a metric relating to the particular document, the second information describing a user interface that is to be visually displayed in connection with the first information when the first information is included in a search results document, the user interface including a user interface element that, when selected, causes an action to be performed in connection with the particular document, the action being performed without obtaining the particular document after the user interface element is selected, and the metric reflecting a measure of quality of the particular document; determine that the metric satisfies a threshold; include, based on the metric satisfying the threshold and in the search results document, third information that causes the user interface to be displayed in connection with the first information; and provide the search results document to the user device.

According to some possible implementations, when including the third information, the one or more processors may: determine, when the metric satisfies the threshold and based on the metric, a maximum number of elements to be included in the user interface; select, based on the maximum number of elements, the user interface element and one or more other elements that are described in the second information; generate the third information based on the user interface element and the one or more other elements, and include the third information in the search results document.

According to some possible implementations, when including the third information, the one or more processors may: determine a ranking of all possible user interface elements described in the second information; determine a quantity of user interface elements to be included in the user interface when the user interface is displayed in connection with the first information; select, from the all possible user interface elements, the user interface element and one or more other elements based on the quantity and the ranking; generate the third information based on the user interface element and the one or more other elements; and include the third information in the search results document.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 1A-1C are diagrams illustrating an overview of an example implementation described herein;

DETAILED DESCRIPTION

The following detailed description refers to the accompanying drawings. The same reference numbers in different drawings may identify the same or similar elements.

Systems and/or methods, as described herein, may receive a search query from a user device, generate a search results document based on the search query, and provide the search results document to the user device. A search result, in the search results document, may be associated with a user interface that allows a user to perform an action, such as initiating the purchase of a product. Systems and/or methods, as described herein, may cause the user interface to be visually displayed in connection with the search result, when the search results document is rendered for display at the user device.

Figure 1B:
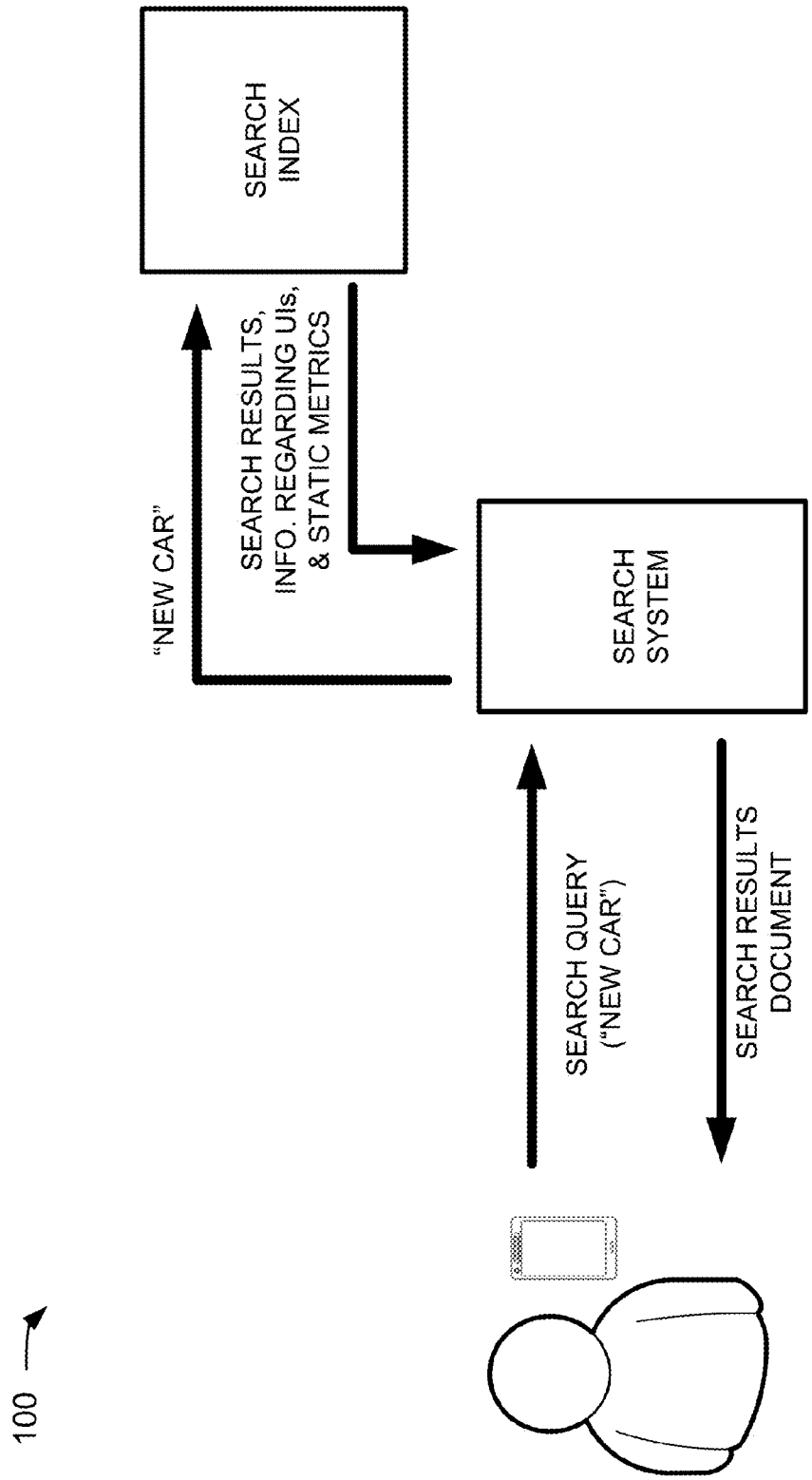
Figure 1C:
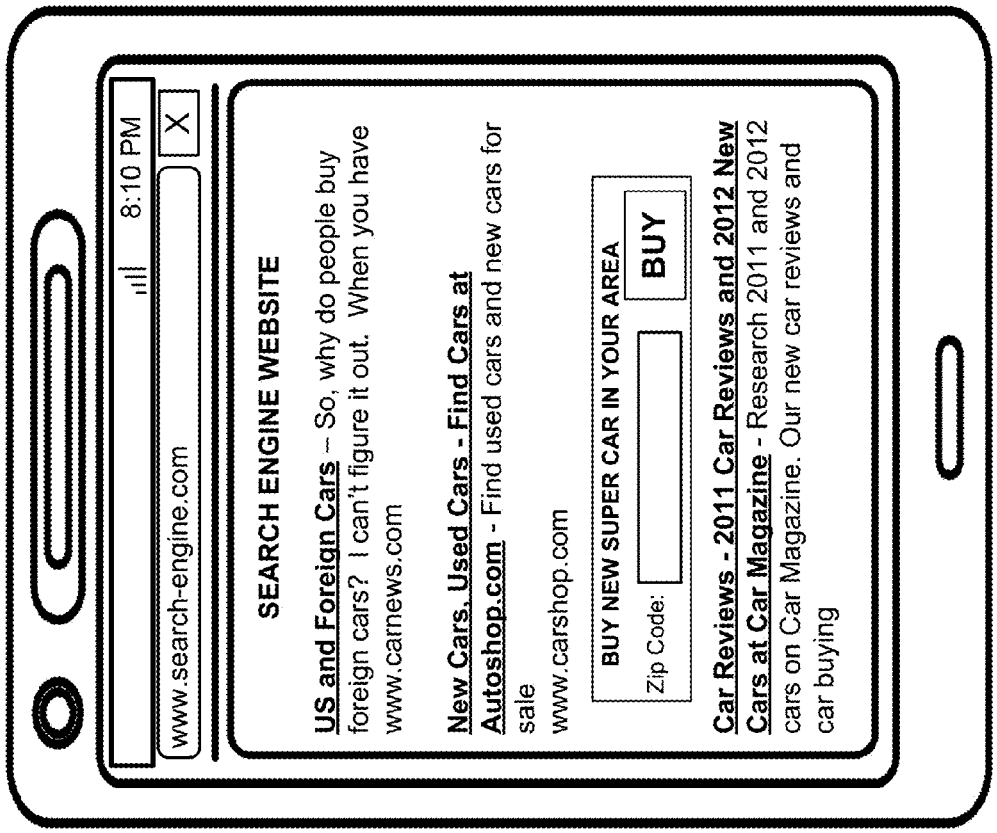

FIGS. 1A-1C are diagrams illustrating an overview 100 of an example implementation described herein. Assume, for example, that an operator of an online store (e.g., www.carshop.com) creates a web page. The web page may be associated with a user interface. The user interface may be visually displayed in connection with information identifying the web page when the web page is included in a search results document provided by a search system. In one example, as shown in FIG. 1A, the web page may include an annotation. The annotation may describe the user interface by identifying a document that includes information about the user interface or by describing one or more user interface elements of the user interface.

As further shown in FIG. 1A, a data server may store the web page, and a search system may crawl the web page. The search system may create a list of keywords based on content of the web page and/or information associated with the web page. The search system may further determine information regarding the user interface based on the annotation. The search system may also determine static metrics for the user interface based on an address associated with the web page and/or the information regarding the user interface. An example of a static metric may be a score that reflects a measure of quality of the web page. The search system may store the keywords associated with the web page, the information regarding the user interface, and/or the static metrics in a search index. In doing so, the search system may associate, in the search index, the keywords associated with the web page, the information regarding the user interface, and/or the static metrics with information identifying the web page.

Further assume that a user is interested in buying a new car. As shown in FIG. 1B, the user may use a user device to submit, to the search system, a search query that includes text (e.g., "new car") to search for web pages that relate to the term "new car." The search system may use the search index to identify web pages based on the search query. The search system may obtain information regarding user interfaces and static metrics that are associated with the identified web pages. The search system may generate a search results document based on the identified web pages, the information regarding user interfaces, and the static metrics. In doing so, the search system may determine, based on the static metrics for the user interface, whether to include information for displaying the user interface, in connection with information identifying the www.carshop.com web page, in the search results document. The search system may provide the search results document to the user device.

The user device may receive the search results document, and may cause all or a portion of the search results document to be displayed to the user, as shown in FIG. 1C. As further shown in FIG. 1C, when the search system determines to include information for displaying the user interface in the search results document, the user device may display the user interface in connection with information identifying the www.carshop.com web page. The user may use elements of the user interface, such as a zip code text entry field and a buy button, to perform an action without visiting the www.carshop.com web page. Instead, the user will visit a different web page of the www.carshop.com website. The different web page is not identified in the search results documents, but is more advanced in a workflow for performing the action associated with purchasing a car via www.carshop.com. For example, the different web page may relate to providing payment information to purchase the car.

As a result, the user does not have to waste time by visiting the web page, or another web page, to perform the action. Furthermore, an operator of the search system and the operator of the online store do not need to enter into a formal agreement in order for the user interface to be visually displayed in connection with information identifying the web page when the information identifying the web page is included in the search results document provided by the search system.

While the following description refers to a web page, implementations, described herein, are equally applicable to other types of documents. A document may refer to any machine-readable and machine-storable work product. A document may include, for example, an e-mail, a website, a business listing, a file, a combination of files, one or more files with embedded links to other files, a news group posting, a blog, an advertisement, an image, a video, a digital map, etc. A document may include textual information, embedded information, such as meta information, images, hyperlinks, user interface elements, etc., and/or embedded instructions, such as Javascript, etc.

Figure 2:
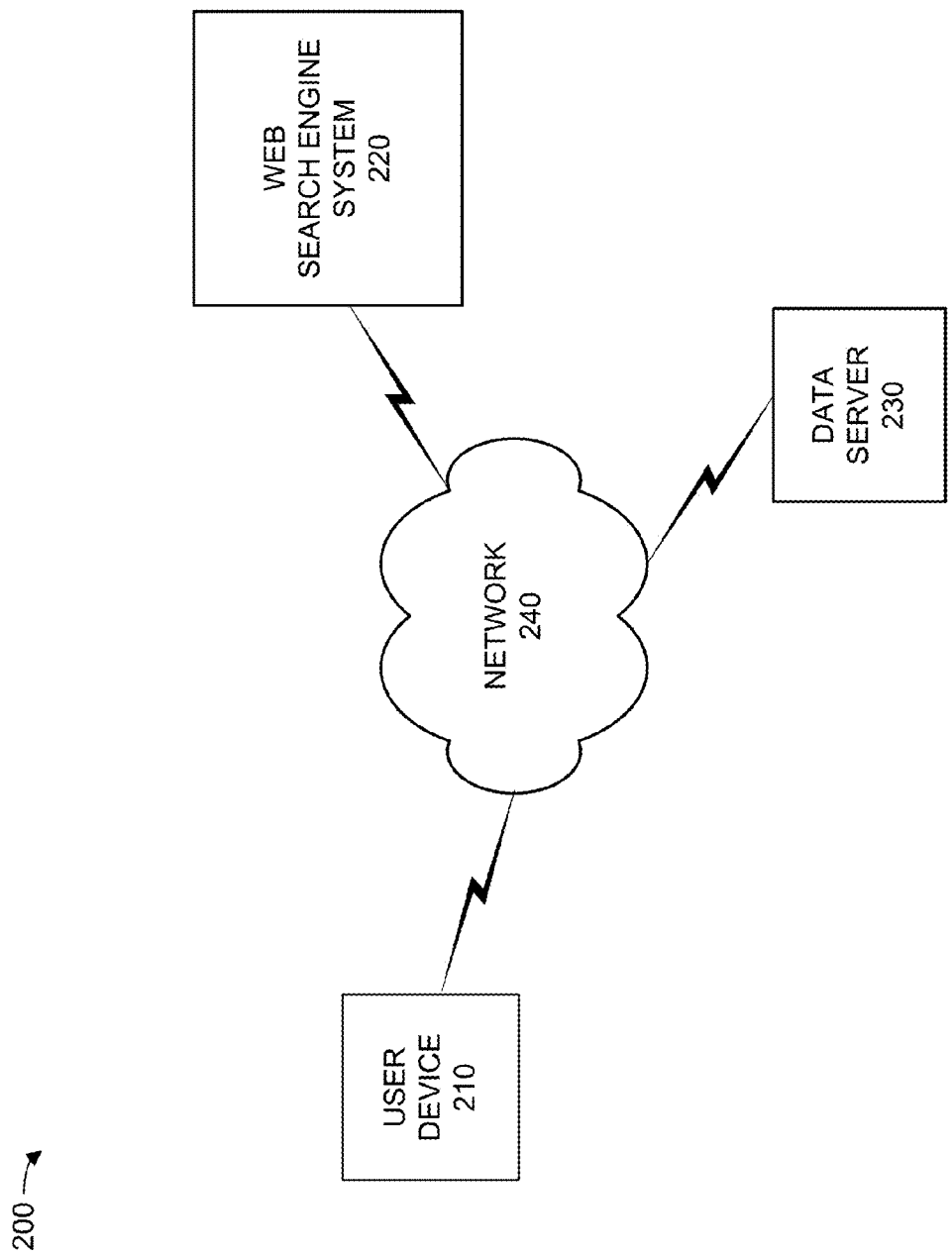
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a web search engine system 220, a data server 230, and a network 240. One user device 210, one web search engine system 220, one data server 230, and one network 240 have been illustrated in FIG. 2 for simplicity. In practice, there may be additional user devices 210, web search engine systems 220, data servers 230, and/or networks 240.

User device 210 may include any device that is capable of communicating with web search engine system 220 and data server 230 via network 240. In one implementation, user device 210 may take the form of a personal computer, a laptop, a tablet computer, a smart phone or another type of mobile telephone device, a personal digital assistant (PDA), a personal media player, a set-top box (STB) connected to a video display device (e.g., a television), or any other type of device capable of communicating with, for example, web search engine system 220. In another implementation, user device 210 may represent multiple devices operated by a user, including, for example, a personal computer and a mobile device.

Web search engine system 220 may include one or more server devices and/or one or more computer systems that process, search, and/or index web pages. In one example, web search engine system 220 may include a crawling component, an indexing component, a search index, and/or a searching component. The crawling component, the indexing component, and/or the searching component may be implemented by a processor, of web search engine system 220, executing instructions. The search index may be stored in a memory of web search engine system 220.

The crawling component may crawl web pages hosted by one or more servers, such as data server 230. In some implementations, the crawling component may operate from a list of addresses to fetch the corresponding web pages from a corpus of web pages, such as the web. The crawling component may extract the addresses, such as URLs, associated with outgoing links in the web pages and add the addresses to the list of addresses to be crawled. The crawling component may also store information associated with the web pages, such as all or part of the web pages, in a memory. For example, the crawling component may send a request to data server 230 for a web page, may receive the web page from data server 230, and may store information associated with the web page in the memory.

The indexing component may process the web pages identified by the crawling component. In some implementations, the indexing component may extract information from an identified web page and associate, in the search index, keywords, based on the extracted information, with information identifying the web page. The extracted information may include text or hypertext markup language (HTML) code included in the web page and/or other information that is located external to the web page. For example, the indexing component may extract text and HTML code from a crawled web page, extract individual terms and/or other data from the text and HTML code, and store those terms and/or other data, as keywords, in the search index. The indexing component may also obtain other information related to the crawled web page and determine keywords based on the other information.

Additionally, the indexing component may determine that a particular web page includes a particular type of annotation. The annotation may specify that a user interface is to be visually displayed in connection with information identifying the particular web page when the information identifying the particular web page is included in a search results document provided by the searching component. The indexing component may determine information regarding the user interface based on the annotation, and may store the information regarding the user interface, in the search index, in association with the information identifying the particular web page.

Each entry in the search index may include a term or other data stored in association with a list of web pages in which the term or other data appears and the location within the web page where the term or other data appears. In another implementation, each entry in the search index may include a web page, a list of terms that appear within the web page, and/or other information (e.g., metadata) associated with the web page. Additionally, an entry in the search index may include information regarding a user interface that is to be visually displayed in connection with information identifying the web page when the information identifying the web page is included in a search results document provided by the searching component. The entry may also include static metrics for the user interface. As described above, a static metric may refer to a score that reflects a measure of quality of the web page.

The searching component may receive a search query, and may perform a search, by using the search index, based on the search query. For example, the searching component may compare the terms of the search query to terms in the search index to obtain a list of search results. Each search result may identify a web page. Additionally, or alternatively, the searching component may receive search results, relevant to the search query, from one or more other search systems (not shown).

The searching component may generate scores for the search results. In one implementation, the score, for a search result, may reflect a measure of relevance of the corresponding web page to the search query. For example, the score may reflect the measure of relevance of the corresponding web page to the one or more search terms in the search query.

Additionally, or alternatively, the score, for a search result, may reflect a measure of quality of the corresponding web page. In these implementations, the search query may be used to identify a relevant web page, which is scored based on the measure of quality of the web page. Several techniques exist for measuring the quality of a web page, such as a technique based on the source of the web page, a technique based on links to or from the web page, a technique based on an age of the web page, a technique based on user accesses of the web page, and/or other techniques.

In some implementations, the score, for a search result, may reflect a combination of a measure of relevance of the corresponding web page to a search query and a measure of quality of the corresponding web page. In some implementations, the score, for a search result, may reflect a weighted combination of a measure of relevance of the corresponding web page to a search query and a measure of quality of the corresponding web page, where the measure of relevance may be weighted differently from the measure of quality. In some implementations, the score, for a search result, may be determined in another manner.

The searching component may rank the search results based on the scores. For example, the searching component may create a search results document and sort the search results, in the search results document, based on the scores of the search results. In one possible implementation, the searching component may provide a search results document that includes information identifying the ranked search results. Each search result, included in the search results document, may include an address associated with a corresponding web page, a snippet of content extracted from the web page, a user interface associated with the web page, and/or other information associated with the web page, the address, and/or the user interface.

Data server 230 may include a server device or a collection of server devices that may be co-located or remotely located. In some implementations, data server 230 may be implemented within a single, common server device or a single, common collection of server devices. In some implementations, data server 230 may host microsites. In some implementations, data server 230 may be affiliated with a same entity (e.g., party, organization, business, company, etc.) as web search engine system 220. In some implementations, data server 230 may not be affiliated with the same entity as web search engine system 220.

Network 240 may include any type of network, such as a local area network ("LAN"), a wide area network ("WAN"), a telephone network, such as the Public Switched Telephone Network ("PSTN") or a cellular network, an intranet, the Internet, or a combination of networks. User devices 210, web search engine system 220, and data server 230 may connect to network 240 via wired and/or wireless connections. In other words, any one of user devices 210, web search engine system 220, and/or data server 230 may connect to network 240 via a wired connection, a wireless connection, or a combination of a wired connection and a wireless connection.

Although FIG. 2 shows example devices/networks of environment 200, in other implementations, environment 200 may include additional devices/networks, fewer devices/networks, different devices/networks, or differently arranged devices/networks than are shown in FIG. 2. Alternatively, or additionally, one or more of the devices of environment 200 may perform one or more functions described as being performed by another one or more of the devices of environment 200. Furthermore, two or more of the devices, of FIG. 2, may be implemented within a single device, or a single device of FIG. 2 may be implemented as multiple, distributed devices.

Figure 3:
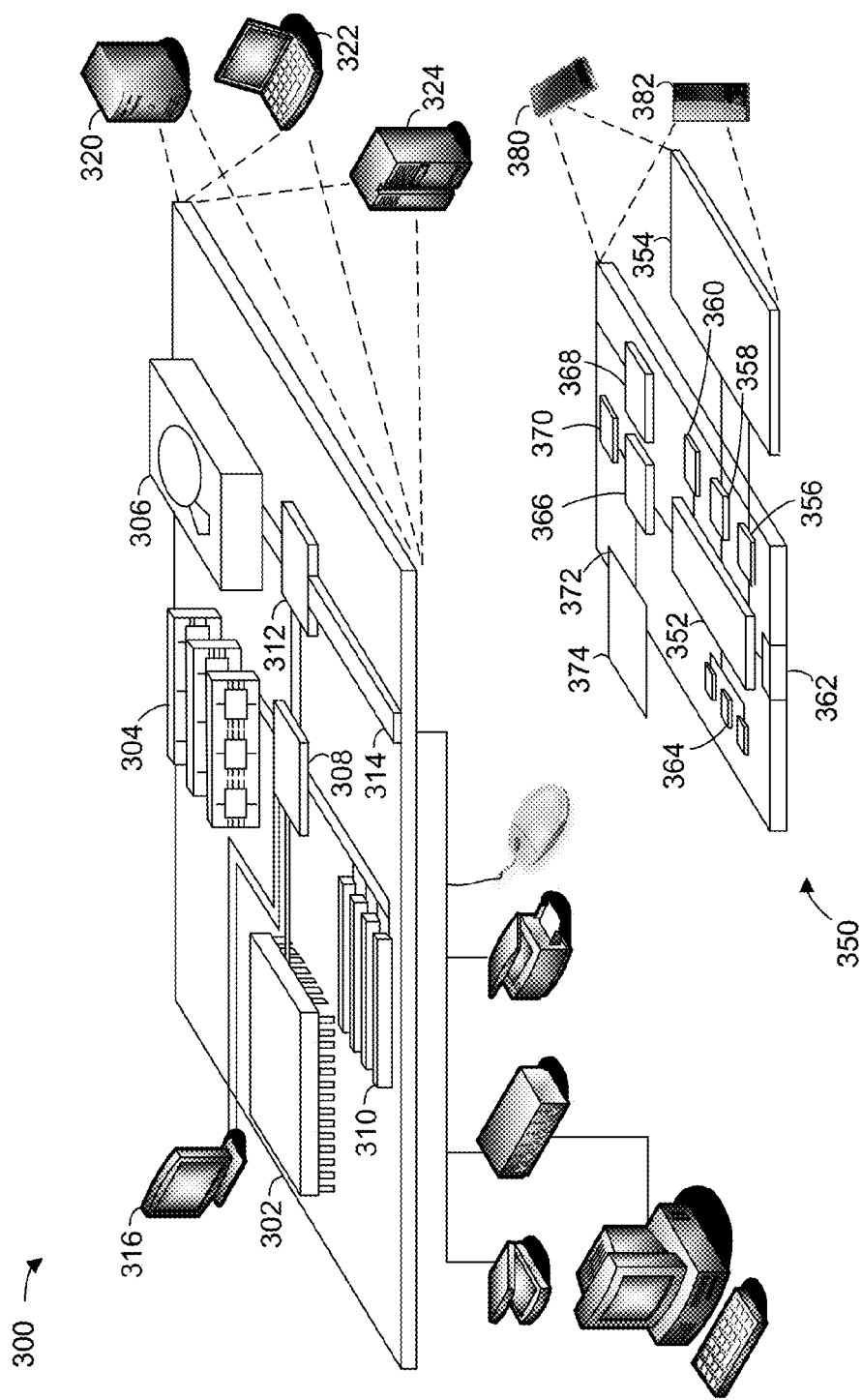
FIG. 3 shows an example of a generic computing device and a generic mobile computing device.

FIG. 3 is a diagram of an example of a generic computing device 300 and a generic mobile computing device 350, which may be used with the techniques described here. Generic computing device 300 or generic mobile computing device 350 may correspond to, for example, user device 210, web search engine system 220, and/or data server 230. Each of user device 210, web search engine system 220, and/or data server 230 may include one or more computing devices 300 or mobile computing devices 350 and/or one or more components of computing devices 300 or one or more components of mobile computing devices 350.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In one implementation, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is exemplary only. In one implementation, high-speed interface 308 is coupled to memory 304, display 316 (e.g., through a graphics processor or accelerator), and to high-speed expansion ports 310, which may accept various expansion cards (not shown). In this implementation, low-speed interface 312 may be coupled to storage device 306 and low-speed expansion port 314. Low-speed expansion port 314, which may include various communication ports (e.g., USB, Bluetooth, Ethernet, wireless Ethernet, etc.), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server 320, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a micro-drive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer-or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver (not shown). In addition, GPS (Global Positioning System) receiver module 370 may provide additional navigation-and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Figure 4:
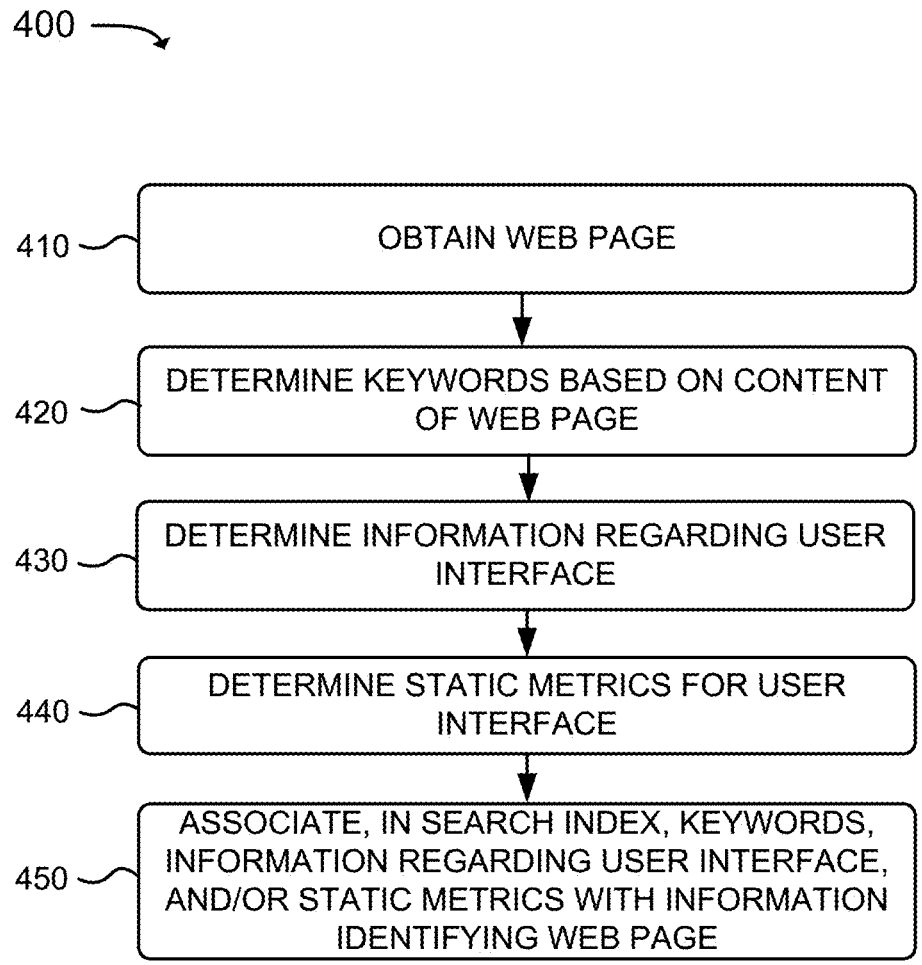
FIGS. 4-5B are flow charts illustrating an example process for associating keywords, information regarding a user interface, and static metrics with information identifying a web page.
Figure 5A:
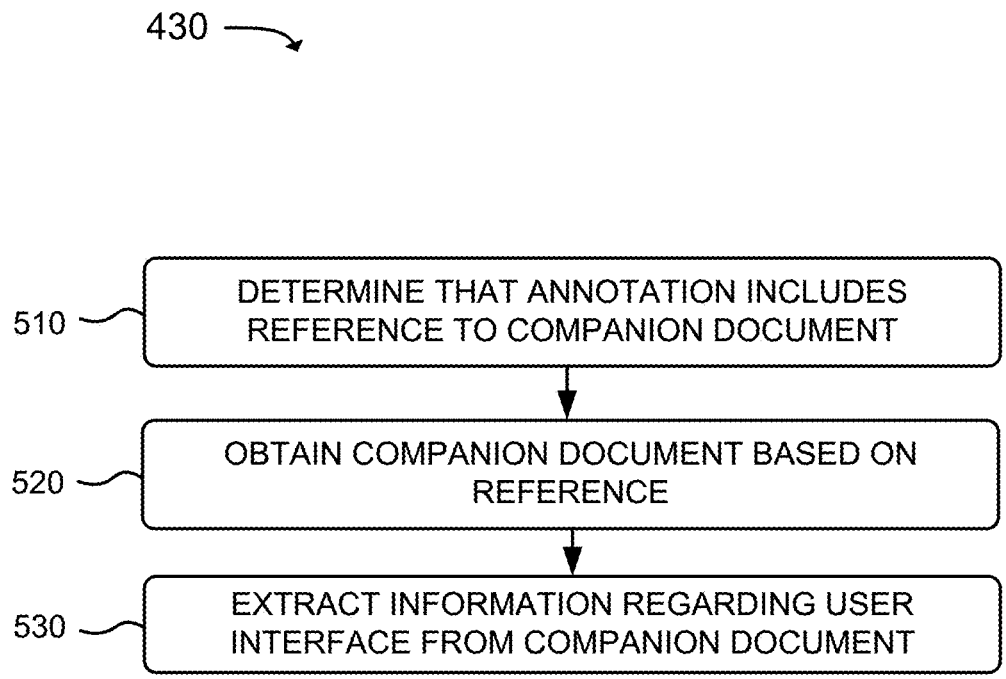
Figure 5B:
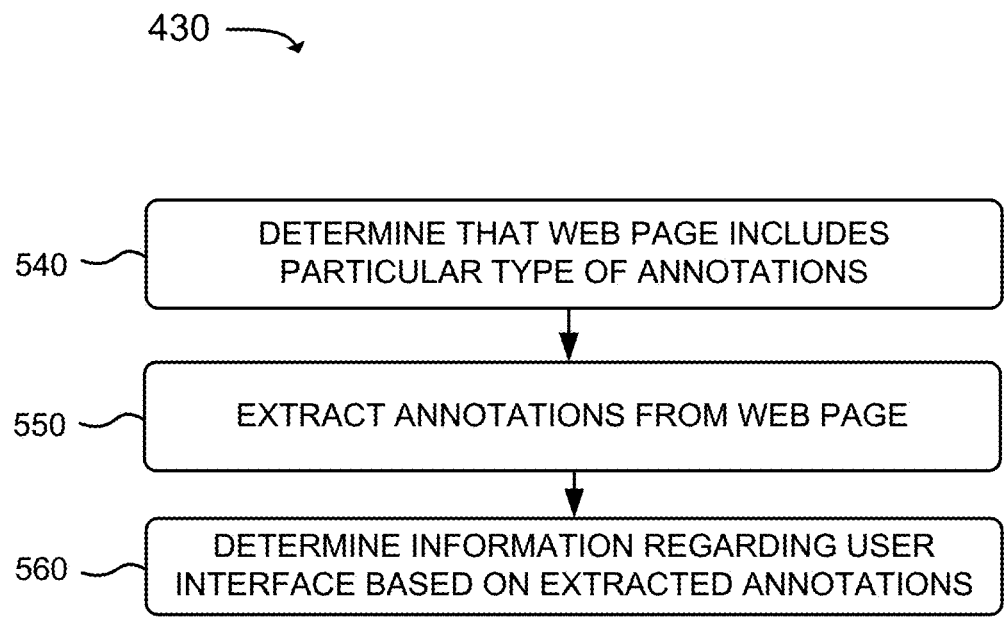

FIGS. 4-5B are flow charts illustrating an example process 400 for associating keywords, information regarding a user interface, and static metrics with information identifying a web page. In one implementation, web search engine system 220 may perform process 400. In other implementations, one or more other devices, separate from, or in combination with, web search engine system 220, may perform some or all of process 400.

As shown in FIG. 4, process 400 may include obtaining a web page (block 410). For example, assume that an operator of data server 230 is an online merchant. Data server 230 may provide web pages for an online store. The web pages may include a web page for purchasing a particular item. The web page may include, for example, a quantity text entry field for entering a quantity of the particular item to be purchased, a zip code text entry field for entering a zip code of a user, and a buy button to add the quantity of the particular item to an online shopping cart of the online store. Assume that the operator wants to allow the user to initiate a process for purchasing the particular item without visiting the web page. The operator may include, in the HTML code for the web page, an annotation. The annotation may include information relating to a user interface that is to be visually displayed in connection with information identifying the web page when the information identifying the web page is included in a search results document provided by web search engine system 220. Additionally, or alternatively, the annotation may include information that points to a companion document that includes information relating to the user interface. In either event, the user interface may allow the user to initiate the process for purchasing the particular item without visiting the web page.

Data server 230 may store the web page, and web search engine system 220 may crawl the web page. The crawling may include using an address of the web page to obtain the web page, and storing all or a portion of the web page in a memory.

Process 400 may further include determining keywords based on content of the web page (block 420). For example, web search engine system 220 may extract information from the text and/or HTML code of the web page. Web search engine system 220 may determine the keywords based on the extracted information.

Process 400 may also include determining information regarding a user interface (block 430). In one example implementation, process block 430 may include the process blocks depicted in FIG. 5A. As shown in FIG. 5A, process block 430 may include determining that the annotation includes a reference to a companion document (block 510), obtaining the companion document based on the reference (block 520), and extracting information regarding the user interface from the companion document (block 530). In one implementation, web search engine system 220 may determine that the annotation, included in the web page, includes a reference, such as "<link rel="actions" href="myactions.xml"/>," pointing to a companion document. Web search engine system 220 may obtain the companion document, from data server 230, based on the reference.

The companion document may include information regarding the user interface. The information may include, for example, a color of the user interface, a size of the user interface, how the user interface is to be displayed (e.g., whether the user interface is to be displayed in the search results document, as a pop-up window, when, for example, a cursor is hovered above a link of the web page in the search results document, or in another manner), possible layout(s) of elements in the user interface, relationship(s) between the user interface elements, etc. The information may further include, for each user interface element, a size of the user interface element, a font for text in the user interface element, a color of the user interface element, an action that is performed when the user interface element is selected, etc. In some implementations, the information may also include one or more rules for selecting one or more of the user interface elements for the user interface. In one example, a rule may specify that one or more of the user interface elements always need to be included in the user interface whenever the user interface is displayed. In another example, a rule may specify that one user interface element (e.g., the zip code text entry field or the quantity text entry field) cannot be included in the user interface without another user interface element (e.g., the buy button). Web search engine system 220 may extract the information regarding the user interface from the companion document.

In another example implementation, process block 430 may include the process blocks depicted in FIG. 5B. As shown in FIG. 5B, process block 430 may include determining that the web page includes a particular type of annotations (block 540), extracting the annotations from the web page (block 550), and determining information regarding the user interface based on the extracted annotations (block 560). For example, web search engine system 220 may determine that the annotation is one of multiple annotations, of a particular type, that are included in the HTML code of the web page. The particular type may indicate that the user interface is to be visually displayed in connection with information identifying the web page when the information identifying the web page is included in the search results document provided by web search engine system 220. Each annotation, of the particular type, may correspond to an element of the user interface and/or the web page. Further to the example above, the annotations may include a first annotation that corresponds to the quantity text entry field, a second annotation that corresponds to the zip code text entry field, and a third annotation that corresponds to the buy button. As an example, the third annotation may include the following text: <a rel="action" href="http://example.com/products/prod-a/buy"/>Buy</a>. Web search engine system 220 may determine that the web page includes the particular type of annotations by analyzing the HTML code of the web page and detecting the presence of the annotations in the HTML code.

Web search engine system 220 may extract the annotations from the web page, and may determine the information regarding the user interface based on the extracted annotations. For example, web search engine system 220 may determine that the user interface includes the buy button based on the third annotation. Web search engine system 220 may further determine, for example, that the buy button includes a "Buy" caption, and that the buy button may be used by the user to perform a particular action. The particular action may include transmitting the quantity entered into the quantity text entry field, and/or the zip code entered into the zip code text entry field, to data server 230. The particular action may further include displaying, based on the quantity and/or the zip code, another web page that is required for completing the process for purchasing of the particular item. The other web page may include, for example, a checkout web page of the online store.

In one example implementation, the quantity text entry field may correspond to a first query parameter and the zip code text entry field may correspond to a second query parameter. For example, when a user enters a zip code (e.g., 91004) into the zip code text entry field and selects the buy button, the user interface may navigate to the other web page by using a particular address (e.g., http://example.com/products/prod-a/buy?zip=91004) that includes the first query parameter (e.g., zip=91004).

Returning to FIG. 4, process 400 may also include determining static metrics for the user interface (block 440). In one implementation, web search engine system 220 may determine static metrics for the user interface based on an address (e.g., a domain name) associated with the web page and/or the types of the elements included in the user interface. In one example, web search engine system 220 may determine, based on the address, a static metric based on a score associated with the web page. The score may reflect a measure of quality of the web page. As discussed above, several techniques exist for measuring the quality of a web page, such as a technique based on the source of the web page, a technique based on an age of the web page, a technique based on user accesses of the web page, a technique based on links to and/or from the web page, and/or other techniques. For example, a score may be higher for a web page from a domain of a popular web site than for a web page from a domain of a less popular web site.

Additionally, or alternatively, web search system 220 may determine the particular address associated with the other web page. Web search engine system 220 may determine, based on the particular address, a static metric based on a different score associated with the other web page. The different score may reflect a measure of quality of the other web page.

Additionally, or alternatively, web search engine system 220 may determine a static metric for each one of the user interface elements. For example, web search engine system 220 may assign, to a user interface element, a value that is within a particular range based on how frequently a type of the user interface element is used by users compared to other types of user interface elements. For example, assume that buy buttons are used more frequently than all other types of user interface elements; assume that text entry fields for entering quantities are used less frequently than buy buttons; and assume that text entry fields for entering quantities are used more frequently than text entry fields for entering zip codes. In this example, assume that web search engine system 220 assigns a value of 10 to the buy button, a value of 7 to the quantity text entry field, and a value of 3 to the zip code text entry field. The static metrics for the user interface may include the values assigned to the elements of the user interface.

Additionally, or alternatively, web search engine system 220 may determine static metric(s) based on a quality of the user interface. Web search engine system 220 may determine the quality of the user interface based one or more factors, such as a click-through rate of the user interface, a terseness of the wording of the user interface, a wordiness of the wording of the user interface, an amount of spelling mistakes in the wording of the of the user interface, and/or a size of the user interface.

Process 400 may also include associating, in a search index, the keywords, the information regarding the user interface, and the static metrics with the web page in a search index (block 450). In one implementation, web search engine system 220 may store the keywords, the information regarding the user interface, and the static metrics in a search index. In doing so, web search engine system 220 may associate, in the search index, the keywords, the information regarding the user interface, and the static metrics with information identifying the web page, such as a network address of the web page.

In another implementation, web search engine system 220 may determine whether the score associated with the web page satisfies a particular threshold. Web search engine system 220 may store, in the search index, the keywords associated with the web page, and not the information regarding the user interface or the static metrics, in association with information identifying the web page when the score does not satisfy the particular threshold. In other words, web search engine system 220 may not store the information regarding the user interface or the static metrics when the score, for the web page, does not satisfy the particular threshold. Web search engine system 220 may store the keywords, the information regarding the user interface, and the static metrics in the search index when the score satisfies the particular threshold.

Additionally, or alternatively, for each user interface element identified in the information regarding the user interface, web search engine system 220 may determine whether a value assigned to the user interface element satisfies a different threshold. When the value satisfies the different threshold, web search engine system 220 may store, in the search index, a portion of the information regarding the user interface associated with the user interface element. Otherwise, when the assigned value does not satisfy the different threshold, web search engine system 220 may not store, in the search index, the portion of the information regarding the user interface associated with the user interface element.

Figure 6:
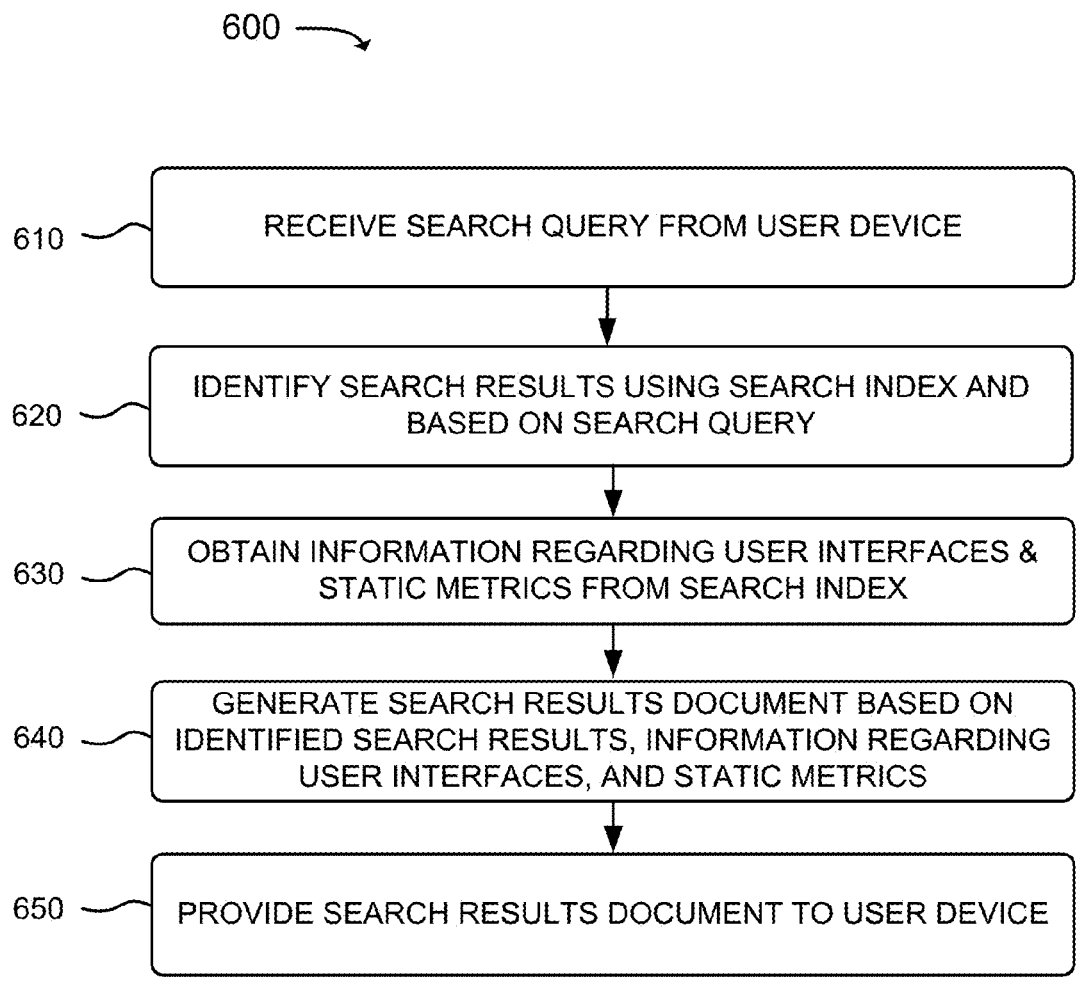
FIGS. 6 are 7 are flow charts illustrating an example process for providing a search results document.
Figure 7:
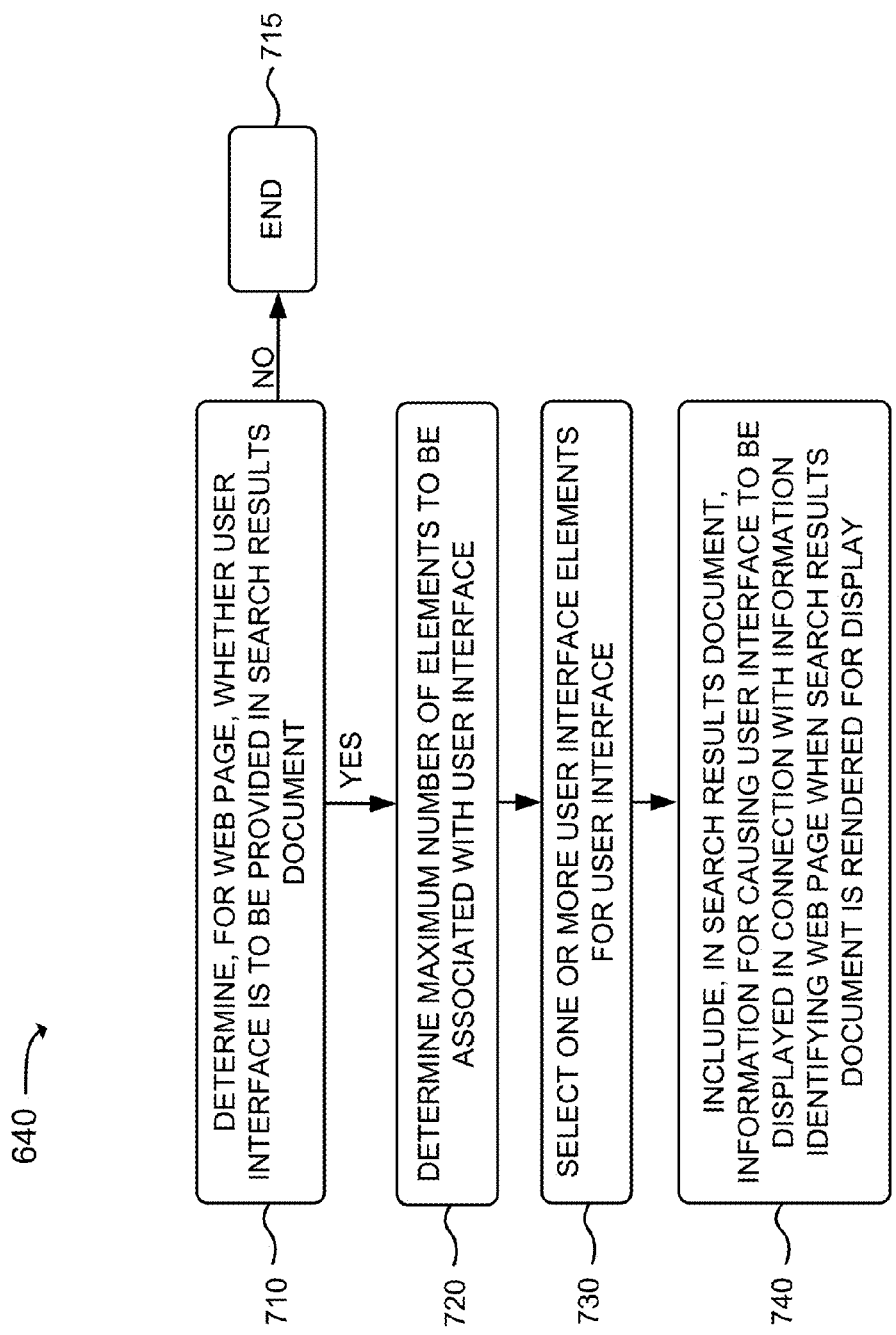

FIGS. 6 and 7 are flow charts illustrating an example process 600 for providing a search results document. In one implementation, web search engine system 220 may perform process 600. In other implementations, one or more other devices, separate from, or in combination with, web search engine system 220, may perform some or all of process 600.

As shown in FIG. 6, process 600 may include receiving a search query from a user device (block 610). In one implementation, a user, of user device 210, may enter a search query into user device 210, and may cause user device 210 to submit the search query to web search engine system 220. Web search engine system 220 may receive the search query from user device 210.

Process 600 may further include identifying search results using a search index and based on the search query (block 620). For example, web search engine system 220 may identify search results by comparing terms of the search query to keywords in a search index. Each search result may identify a web page. As described above, web search engine system 220 may determine scores for the search results, and may rank the search results based on the determined scores.

Process 600 may also include obtaining information regarding user interfaces and static metrics from a search index (block 630). As indicated above, the search index may associate information identifying a web page with information regarding a user interface and static metrics for the user interface. Web search engine system 220 may use the information identifying the web page to obtain the information regarding the user interface and the static metrics from the search index.

In one implementation, web search engine system 220 may obtain such information, including information regarding user interfaces and static metrics, for all search results for which such information is stored in the search index. In another implementation, web search engine system 220 may obtain such information, if available, for only a particular quantity of search results that are ranked above a particular threshold and/or that are associated with scores that satisfy a different threshold. For example, web search engine system 220 may obtain such information, if available, for only the top ten search results. In yet another implementation, web search engine system 220 may obtain such information, if available, for only those search results that satisfy some criteria. For example, web search engine system 220 may obtain such information, if available, for only search results that are associated with addresses that include ".com." as a top-level domain. In still yet another implementation, web search engine system 220 may obtain such information based on criteria configured/provided by the user of user device 210. For example, web search engine system 220 may not obtain any such information when the user indicates that the user does not want any user interfaces displayed in connection with information identifying the web pages identified by the search results.

Process 600 may also include generating a search results document based on the identified search results, the information regarding the user interfaces, and the static metrics (block 640). For example, web search engine system 220 may generate a search results document that includes a list of the identified search results. Process block 640 may include the process blocks depicted in FIG. 7. Web search engine system 220 may perform the process depicted in FIG. 7 for each of the identified search results for which the search index stores information regarding a user interface.

As shown in FIG. 7, process block 640 may include determining, for a web page, whether a user interface is to be provided in the search results document (block 710). In one implementation, web search engine system 220 may determine whether a particular static metric (e.g., a static metric based on a score associated with the web page) is higher than a first threshold, whether a rank of the search result associated the web page is higher than a second threshold, and/or whether a relevance score, which reflects a measure of the relevance of the corresponding web page to the one or more search terms in the search query, is higher than a third threshold. Web search engine system 220 may determine that a user interface is to be provided, in the search results document, in connection with information identifying the web page when the particular static metric is higher than the first threshold, when the rank is higher than the second threshold, and/or when the relevance score is higher than the third threshold. In another implementation, web search engine system 220 may determine that a user interface is to be provided, in the search results document, in connection with information identifying the web page when the web page is one of the top-ranked above search results. For example, web search engine system 220 may provide user interfaces for only the top five search results. Additionally, or alternatively, as discussed above, the user may indicate whether the user wants any user interfaces displayed in connection with information identifying web pages. Web search engine system 220 may determine whether a user interface is to be provided based on such indication provided by the user.

If the user interface is not to be provided in the search results document (block 710—NO), process block 640 may include ending the process depicted in FIG. 7 for the web page (block 715). In one implementation, when web search engine system 220 determines that the user interface is not to be provided in the search results document, web search engine system 220 may end the process depicted in FIG. 7 for the web page. Web search engine system 220 may the repeat the process depicted in FIG. 7 for another web page for which information regarding a user interface has been obtained.

If the user interface is to be provided in the search results document (block 710—YES), process block 640 may include determining a maximum number of elements to be associated with user interface (block 720). In one example implementation, when web search engine system 220 determines that the user interface is to be provided in the search results document, web search engine system 220 may determine a maximum number of elements to be associated with the user interface. Web search engine system 220 may determine the maximum number of elements based on the static metrics and/or the ranking of the search result that includes information identifying the web page. For example, when the ranking is higher than a first value and lower than a second value, web search engine system 220 may determine that the maximum number of elements is two elements. Additionally, or alternatively, web search engine system 220 may determine a maximum size of the user interface based on the static metrics and/or the ranking of the search result that includes information identifying the web page. The maximum size may specify a maximum amount of space that can be taken up by the user interface in a screen of user device 110.

Additionally, or alternatively, web search engine system 220 may determine a minimum size requested for the user interface based on the information regarding the user interface. The minimum size may include a quantity of elements that are to be included in the user interface and/or a minimum amount of space for the user interface. Web search engine system 220 may determine whether the minimum size is greater than the determined maximum number of elements and/or the maximum size. Web search engine system 220 may determine that the user interface is not to be provided in the search results document (block 710—NO) when the minimum size is greater than the determined maximum number of elements and/or the maximum size.

Returning to FIG. 7, process block 640 may further include selecting one or more user interface elements for the user interface (block 730). In one implementation, the maximum number of elements may indicate a maximum quantity, such as two, of user interface elements that can be selected. The information regarding the user interface may include information about possible user interface elements that can be included in the user interface. Web search engine system 220 may select one or more user interface elements, from the possible user interface elements, based on the static metrics. For example, assume that the possible user interface elements include a buy button, a review button, a quantity text entry field, and a zip code text entry field. Web search engine system 220 may rank the possible user interface elements based on the static metrics associated with the possible user interface elements.

Assume, for example, that the static metrics specify a first value (e.g., 10) for the buy button, a second value (e.g., 5.5) for the review button, a third value (e.g., 11) for the quantity text entry field, and a fourth value (e.g., 4.5) for the zip code text entry field. Web search engine system 220 may rank the possible user interface elements, from highest to lowest, as follows: the buy button, the quantity text entry field, the review button, and the zip code text entry field. When the maximum number of elements is equal to, for example, two units, web search engine system 220 may select the two highest-ranked user interface elements (e.g., the buy button and the quantity text entry field) for the user interface.

Process block 640 may also include including, in the search results document, information for causing the user interface to be displayed in connection with information identifying the web page when the search results document is rendered for display (block 740). For example, web search engine system 220 may generate information for displaying the user interface based on the one or more selected user interface elements. Web search engine system 220 may include, in the search results document, the information for displaying the user interface in connection with information identifying the web page. Some of the selected user interface elements may be associated with code that causes an action to be performed. For example the buy button may trigger an action, while the quantity text entry field may provide a parameter for the action. Therefore, the code for the action(s) is also included in the search results document.

Returning to FIG. 6, process 600 may also include providing the search results document to the user device (block 650). In one implementation, web search engine system 220 may provide the search results document to user device 210. User device 210 may receive the search results document, and may cause all or a portion of the search results document to be displayed to the user, including a user interface that may be visually displayed in connection with information identifying a web page that is included in the search results document.

Figure 8A:
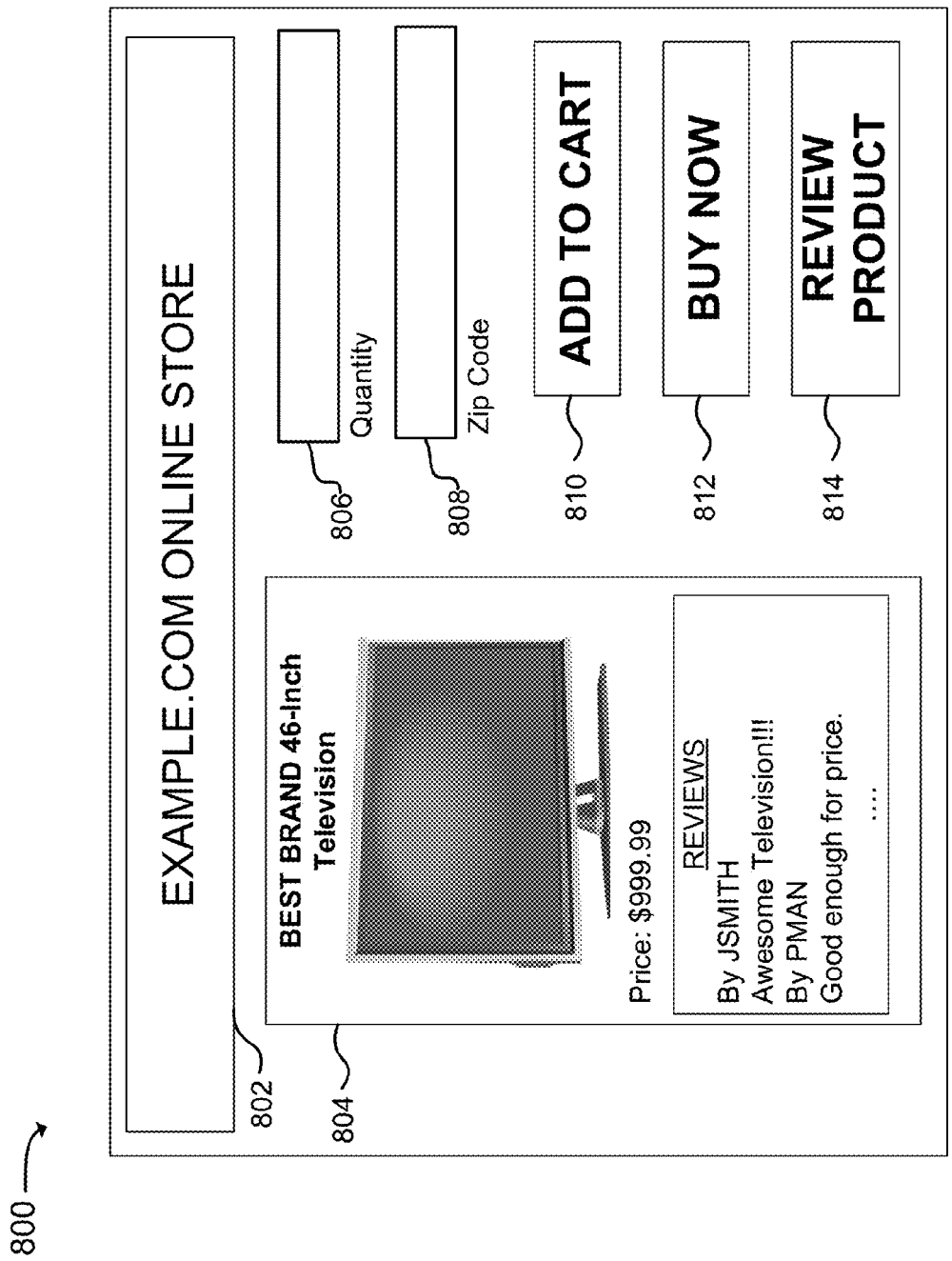
FIGS. 8A-8E illustrate an example of providing a search results document.

FIGS. 8A-8E illustrate an example of providing a search results document. FIG. 8A illustrates an example web page 800 provided by data server 230 of an online store. As shown in FIG. 8A, web page 800 may include a web page header 802, product information 804, a quantity text entry field 806, a zip code entry field 808, an add to cart button 810, a buy now button 812, and a review product button 814.

Web page header 802 may include, for example, one or more user interface elements that can be used to access other web pages of a web site that includes web page 800. Product information 804 may include information about a product. The information about the product may include, for example, an image of the product, a price of the product, a description of the product, reviews of the product, etc. For this example, assume that the product is a television. Quantity text entry field 806 may allow a user to enter a quantity of the product that the user decides to purchase from the online store. Zip code entry field 808 may allow the user to enter a zip code of a shipping address of the user.

When add to cart button 810 is selected by the user, an add to cart action may occur. The add to cart action may include transmitting the quantity and/or the zip code to data server 230 from user device 210. The add to cart action may further include data server 230 adding the quantity of the product to a shopping cart of the user and providing, based on the quantity and/or the zip code, a shopping cart web page, for viewing the shopping cart of the user, to user device 210. For this example, assume that the address of the shopping cart web page is www.example.com/cart/view.html. The shopping cart web page may also include buy now button 812.

When buy now button 812 is selected by the user, a buy now action may occur. The buy now action may include transmitting the quantity and/or the zip code to data server 230 from user device 210. The buy now action may further include data server 230 adding the quantity of the product to the shopping cart of the user and providing a checkout web page 850, described further below with reference to FIG. 8E, to user device 210. For this example, assume that the address of checkout web page 850 is www.example.com/check-out/sign-in-page.html.

When review product button 814 is selected by the user, an add review action may occur. The add review action may include data server 230 providing, to user device 210, an add review web page that allows the user to add a review of the product identified in product information 804.

Figure 8B:
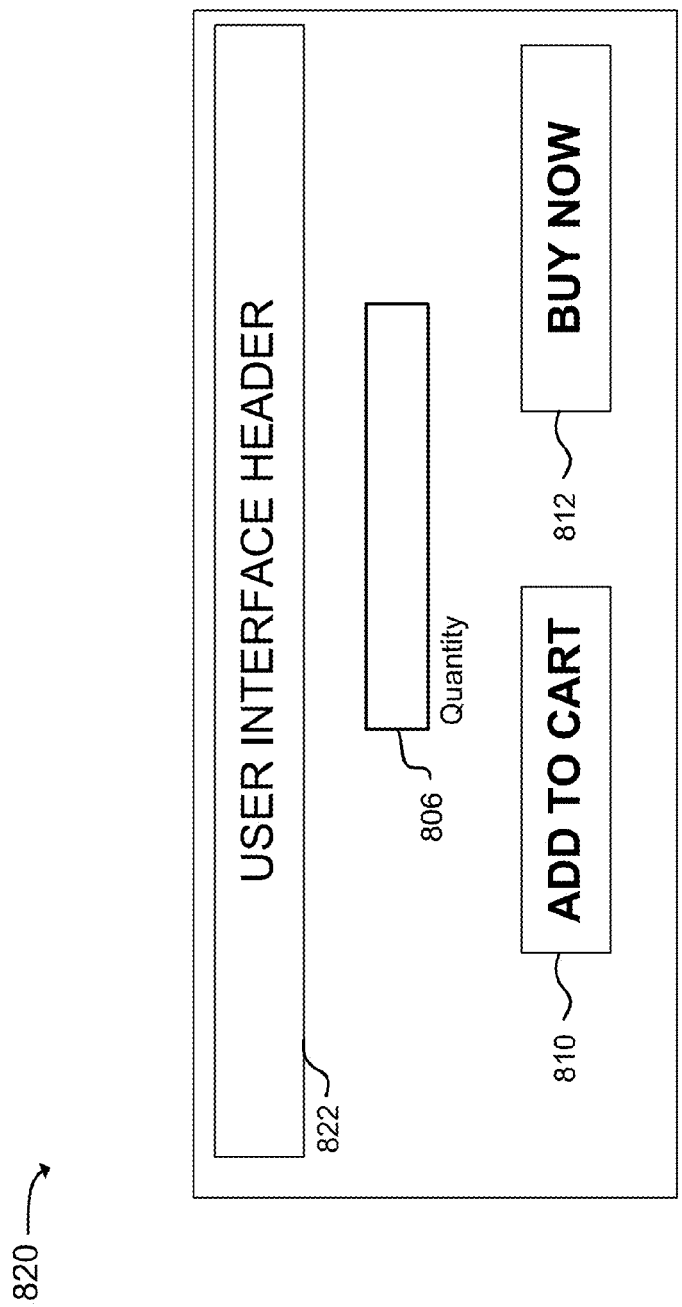

Assume that data server 230 stores web page 800. The HTML code of web page 800 may include an annotation. The annotation may include information relating to a user interface 820 (FIG. 8B). The annotation may specify that user interface 820 may be visually displayed in connection with information identifying web page 800 when the information identifying web page 800 is included in a search results document provided by web search engine system 220.

As shown in FIG. 8B, user interface 820 may include a user interface header 822, quantity text entry field 806, add to cart button 810, and buy now button 812. User interface header 822 may include one or more user interface elements that are not included in web page 800. For example, user interface header 822 may include a text box with instructions to enter a quantity in quantity text entry field 806 and to select one of add to cart button 810 or buy now button 812 in order to purchase the product without visiting web page 800. Quantity text entry field 806, add to cart button 810, and buy now button 812 of user interface 820 may correspond to quantity text entry field 806, add to cart button 810, and buy now button 812 of web page 800.

Further to the example above, web search engine system 220 may obtain web page 800 from data server 230. Web search engine system 220 may determine keywords based on the content of web page 800. Web search engine system 220 may further determine information regarding user interface 820 based on the annotation. Web search engine system 220 may also determine static metrics, for user interface 820, based on a score associated with web page 800 and/or based on user interface element types that are associated with quantity text entry field 806, add to cart button 810, and buy now button 812. Web search engine system 220 may store, in a search index, the keywords, the information regarding user interface 820, and the static metrics in association with information identifying web page 800.

Figure 8C:
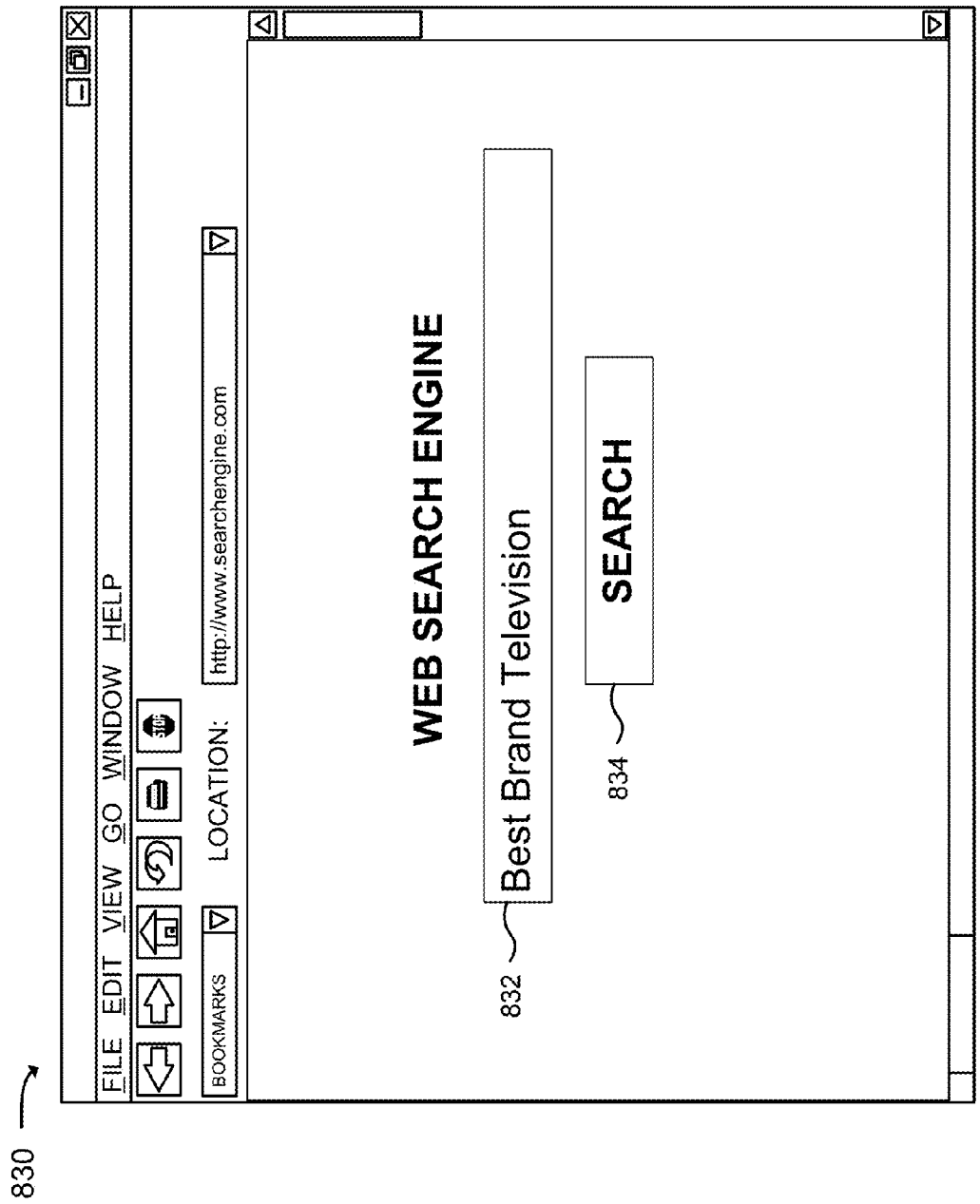

FIG. 8C illustrates an example user interface 830 of web search engine system 220 that is used to receive a search query. As shown in FIG. 8C, user interface 830 may include a query text entry field 832 and a search button 834. Assume that the user uses user device 210 to enter a search query "Best Brand Television" into query text entry field 832, and that the user selects search button 834 after entering the search query. When the user selects search button 834, user device 210 may transmit the search query "Best Brand Television" to web search engine system 220. Web search engine system 220 may use the search index to identify a list of web pages relating to the search query.

Thereafter, web search engine system 220 may obtain, from the search index, the information regarding user interface 820 and the static metrics that are stored in association with the information identifying web page 800. Web search engine system 220 may generate a search results document 844 (FIG. 8D) based on the identified search results, the information regarding user interface 820, and the static metrics.

Figure 8D:
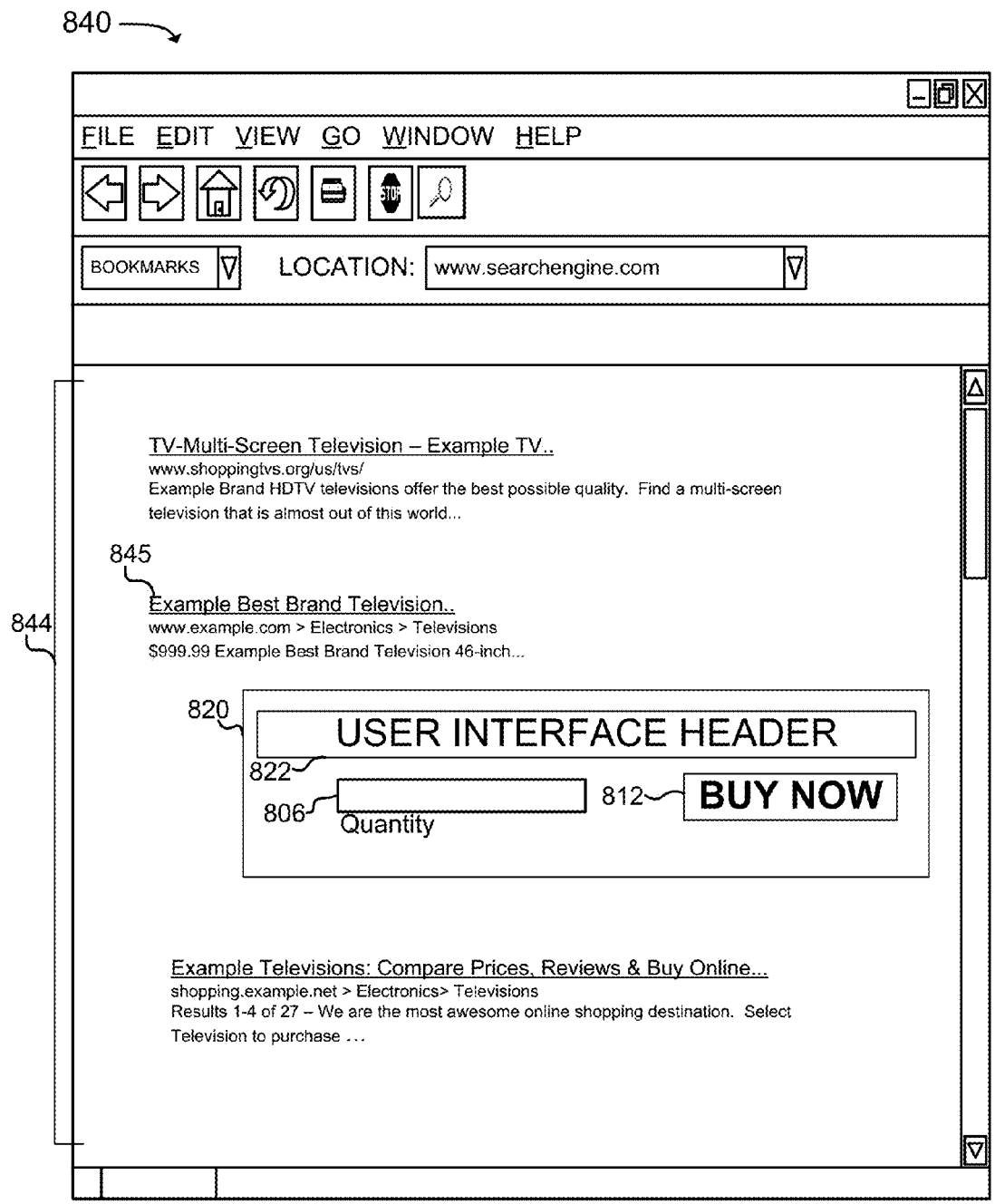

FIG. 8D illustrates an example user interface 840 that may display a portion of search results document 844. As shown in FIG. 8D, search results document 844 may include information 845 that identifies web page 800 and user interface 820 that is displayed in connection with information 845. As further shown in FIG. 8D, web search engine system 220 may only select user interface header 822, quantity text entry field 806, and buy now button 812 for user interface 820. Accordingly, search results document 844 may only include information for displaying user interface header 822, quantity text entry field 806, and buy now button 812 of user interface 820.

Web search engine system 220 may transmit search results document 844 to user device 210. User device 210 may receive search results document 844, and may cause all or a portion of search results document 844 to be displayed in user interface 840, as shown in FIG. 8D.

Figure 8E:
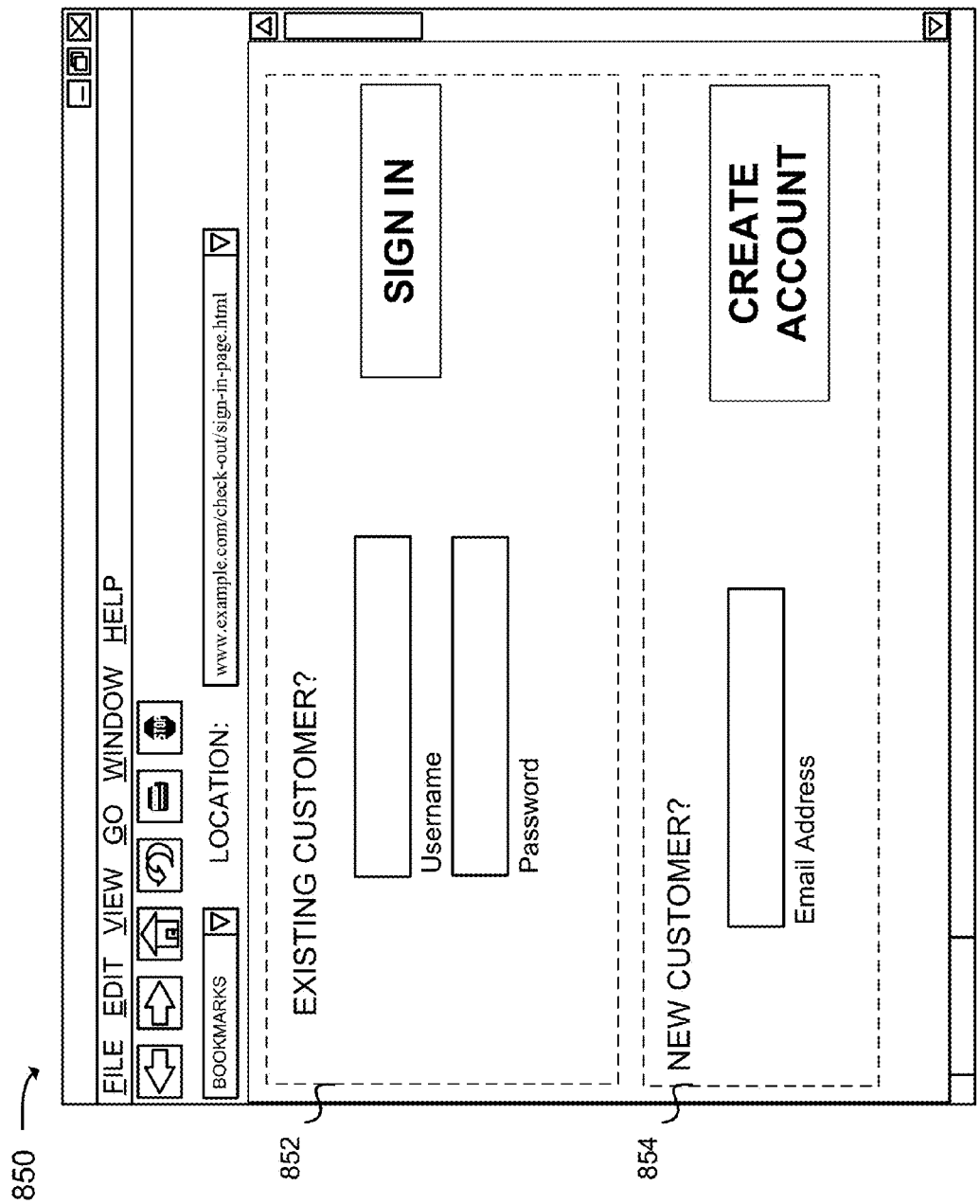

Information 845 identifying web page 800 may include a link to web page 800. If the user selects the link, user device 210 may receive web page 800 from data server 230, and may display web page 800. If the user enters a quantity into quantity text entry field 806 and selects buy now button 812, user device 210 may receive checkout web page 850 (FIG. 8E). As a result, the user may access checkout web page 850 without visiting web page 800 or the shopping cart web page. Once signed in or registered, the user may complete the purchase of the television.

As shown in FIG. 8E, checkout web page 850 may include user interface elements 852 and user interface elements 854. The user may use user interface elements 852 in order to sign-in into an existing account of the user. Alternatively, the user may use user interface elements 854 in order to create a new account.

Implementations described herein may allow an owner of a web page to include an annotation, relating to a user interface, in the HTML code of the web page. The annotation may indicate that the user interface is to be displayed in connection with information identifying the web page when the information identifying the web page is included in a search results document provided by a web search engine system. As a result, a user may use the user interface to perform action(s) on the web page without visiting the web page.

The foregoing description provides illustration and description, but is not intended to be exhaustive or to limit the implementations to the precise form disclosed. Modifications and variations are possible in light of the above disclosure or may be acquired from practice of these implementations.

For example, while series of blocks have been described with regard to FIGS. 4-7, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

Also, certain portions of the implementations have been described as a "component" that performs one or more functions. The term "component" may include hardware, such as a processor, an ASIC (application-specific integrated circuit), or an FPGA (field programmable gate array), or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a set of one or more first servers, a query from a client device;
   in response to receiving the query, identifying, by one or more of the first servers, at least one index entry that is associated with a first document that (i) is responsive to the query, and (ii) is hosted by one or more second servers, wherein the index entry includes (i) an indication of a graphical user interface that is based on a document annotation associated with the first document and (ii) a static metric that is indicative of the quality of the first document, wherein the graphical user interface facilitates access to functionality provided by one or more functions within the first document;

generating, by one or more of the first servers, a response to the query that includes multiple search results, wherein at least one particular search result of the multiple search results is a reference to the first document that is associated with the identified index entry;

determining, by the one or more first servers, whether the graphical user interface should be associated with the reference to the first document in a search results document based on (i) the document annotation and (ii) the static metric stored in the index entry;

in response to determining that the graphical user interface should be associated with the reference to the first document in a search results document based on (i) the document annotation and (ii) the static metric stored in the index entry, obtaining, by one or more of the first servers, information relating to the graphical user interface from the index entry; and providing, by one or more of the first servers, a search results document that includes at least (i) the reference to the first document that is associated with the identified index entry, and (ii) the graphical user interface that facilitates access to functionality provided by one or more functions within the first document.

2. The method of claim 1, wherein determining whether the graphical user interface should be associated with the reference to the first document in a search results document based on (i) the document annotation and (ii) the static metric stored in the index entry comprises:

identifying a static metric that is associated with the first document;

determining whether the static metric exceeds a predetermined threshold; and in response to determining that the static metric exceeds the predetermined threshold, determining to provide the graphical user interface in the search results document.

3. The method of claim 1, wherein determining whether the graphical user interface should be associated with the reference to the first document in a search results document based on (i) the document annotation and (ii) the static metric stored in the index entry comprises:

identifying a static metric that is associated with the first document;

determining whether the static metric exceeds a predetermined threshold; and in response to determining that the static metric does not exceed the predetermined threshold, determining not to provide a graphical user interface that is associated with the first document in the search results document.

4. The method of claim 1, wherein the index entry includes an indication of program code that is associated with the graphical user interface, the method further comprising:

in response to determining that the graphical user interface should be associated with the reference to the first document in a search results document based on (i) the document annotation and (ii) the static metric stored in the index entry, obtaining, by the first server, the graphical user interface and the program code; and providing, by one or more of the first servers, a search results document that includes at least (i) a reference to the first document that is associated with the identified index entry, (ii) the graphical user interface that facilitates access to functionality provided by one or more functions within the first document, and (iii) the program code that causes the functionality provided by one or more functions within the first document to be performed using the graphical user interface that is included within the search results document.

5. The method of claim 1, wherein the graphical user interface includes multiple graphical user interface elements.

6. The method of claim 5, wherein obtaining, by one or more of the first servers, the graphical user interface from the index entry comprises:

identifying a subset of the graphical user interface elements from the multiple graphical user interface elements based on a graphical user interface rule; and retrieving the subset of graphical user interface elements that satisfy the graphical user interface rule.

7. The method of claim 5, further comprising:

accessing a graphical user interface rule that specifies (i) a set of graphical user interface elements of the multiple graphical user interface elements that should be provided for display in a search results document, and (ii) the layout of the set of graphical user interface elements within the search results document;

generating the search results document based on the graphical user interface rule.

8. A system comprising:

one or more computers and one or more storage devices storing instructions that are operable, when executed by the one or more computers, to cause the one or more computers to perform operations comprising:

receiving, by a set of one or more first servers, a query from a client device;

in response to receiving the query, identifying, by one or more of the first servers, at least one index entry that is associated with a first document that (i) is responsive to the query, and (ii) is hosted by one or more second servers, wherein the index entry includes (i) an indication of a graphical user interface that is based on a document annotation associated with the first document and (ii) a static metric that is indicative of the quality of the first document, wherein the graphical user interface facilitates access to functionality provided by one or more functions within the first document;

generating, by one or more of the first servers, a response to the query that includes multiple search results, wherein at least one particular search result of the multiple search results is a reference to the first document that is associated with the identified index entry;

determining, by the one or more first servers, whether the graphical user interface should be associated with the reference to the first document in a search results document based on (i) the document annotation and (ii) static metric stored in the index entry;

in response to determining that the graphical user interface should be associated with the reference to the first document in a search results document based on (i) the document annotation and (ii) the static metric stored in the index entry, obtaining, by one or more of the first servers, information relating to the graphical user interface from the index entry; and providing, by one or more of the first servers, a search results document that includes at least (i) the reference to the first document that is associated with the identified index entry, and (ii) the graphical user interface that facilitates access to functionality provided by one or more functions within the first document.

9. The system of claim 8, wherein determining whether the graphical user interface should be associated with the reference to the first document in a search results document based on (i) the document annotation and (ii) the static metric stored in the index entry comprises:
identifying a static metric that is associated with the first document;
determining whether the static metric exceeds a predetermined threshold; and
in response to determining that the static metric exceeds the predetermined threshold, determining to provide the graphical user interface in the search results document.

10. The system of claim 8, wherein determining whether the graphical user interface should be associated with the reference to a first document in a search results document based on (i) the document annotation and (ii) the static metric stored in the index entry comprises:
identifying a static metric that is associated with the first document;
determining whether the static metric exceeds a predetermined threshold; and
in response to determining that the static metric does not exceed the predetermined threshold, determining not to provide a graphical user interface that is associated with the the first document in the search results document.

11. A non-transitory computer-readable medium storing software comprising instructions executable by one or more computers which, upon such execution, cause the one or more computers to perform operations comprising:
receiving, by a set of one or more first servers, a query from a client device;
in response to receiving the query, identifying, by one or more of the first servers, at least one index entry that is associated with a first document that (i) is responsive to the query, and (ii) is hosted by one or more second servers, wherein the index entry includes (i) an indication of a graphical user interface that is based on a document annotation associated with the first document and (ii) a static metric that is indicative of the quality of the first document, wherein the graphical user interface facilitates access to functionality provided by one or more functions within the first document;
generating, by one or more of the first servers, a response to the query that includes multiple search results, wherein at least one particular search result of the multiple search results is a reference to the first document that is associated with the identified index entry;
determining, by the one or more first servers, whether the graphical user interface should be associated with the reference to the first document in a search results document based on (i) the document annotation and (ii) the static metric stored in the index entry;
in response to determining that the graphical user interface should be associated with the reference to the first document in a search results document based on (i) the document annotation and (ii) the static metric stored in the index entry, obtaining, by one or more of the first servers, information relating to the graphical user interface from the index entry; and
providing, by one or more of the first servers, a search results document that includes at least (i) the reference to the first document that is associated with the identified index entry, and (ii) the graphical user interface that facilitates access to functionality provided by one or more functions within the first document.

12. The computer-readable medium of claim 11, wherein determining whether the graphical user interface should be associated with the reference to the first document in a search results document based on (i) the document annotation and (ii) the static metric stored in the index entry comprises:
identifying a static metric that is associated with the first document;
determining whether the static metric exceeds a predetermined threshold; and
in response to determining that the static metric exceeds the predetermined threshold, determining to provide the graphical user interface in the search results document.

13. The computer-readable medium of claim 11, wherein determining whether the graphical user interface should be associated with the reference to the first document in a search results document based on (i) the document annotation and (ii) the static metric stored in the index entry comprises:
identifying a static metric that is associated with the first document;
determining whether the static metric exceeds a predetermined threshold; and
in response to determining that the static metric does not exceed the predetermined threshold, determining not to provide a graphical user interface that is associated with the first document in the search results document.

14. The computer-readable medium of claim 11,
wherein the index entry includes an indication of program code that is associated with the graphical user interface, the operations further comprising:
in response to determining that the graphical user interface should be associated with the reference to the first document in a search results document based on (i) the document annotation and (ii) the static metric stored in the index entry, obtaining, by the first server, the graphical user interface and the program code; and
providing, by one or more of the first servers, a search results document that includes at least (i) a reference to the first document that is associated with the identified index entry, (ii) the graphical user interface that facilitates access to functionality provided by one or more functions within the first document, and (iii) the program code that causes the functionality provided by one or more functions within the first document to be performed using the graphical user interface that is included within the search results document.

15. The computer-readable medium of claim 11, wherein the graphical user interface includes multiple graphical user interface elements.

16. The computer-readable medium of claim 15, wherein obtaining, by one or more of the first servers, the graphical user interface from the index entry comprises:
identifying a subset of the graphical user interface elements from the multiple graphical user interface elements based on a graphical user interface rule; and
retrieving the subset of graphical user interface elements that satisfy the graphical user interface rule.

17. The computer-readable medium of claim 15, further comprising:
- accessing a graphical user interface rule that specifies (i) a set of graphical user interface elements of the multiple graphical user interface elements that should be provided for display in a search results document, and (ii) the layout of the set of graphical user interface elements within the search results document;
- generating the search results document based on the graphical user interface rule.

* * * * *